(12) United States Patent
Ziv

(10) Patent No.: US 6,539,590 B2
(45) Date of Patent: Apr. 1, 2003

(54) SEAT BELT TIGHTNER

(76) Inventor: Avraham Ziv, 19606 Linnel St., Tarzana, CA (US) 91356

( * ) Notice: Subject to any disclaimer, the term of this patent is extended or adjusted under 35 U.S.C. 154(b) by 0 days.

(21) Appl. No.: 09/956,334

(22) Filed: Sep. 19, 2001

(65) Prior Publication Data

US 2002/0033631 A1 Mar. 21, 2002

Related U.S. Application Data

(60) Provisional application No. 60/233,666, filed on Sep. 19, 2000.

(51) Int. Cl.[7] .............................. A44B 11/00; A47C 1/08; B25B 25/00
(52) U.S. Cl. ................ 24/68 SB; 24/68 CD; 24/71 ST; 24/269; 24/909; 24/685; 297/250.1
(58) Field of Search ........................... 24/68 SB, 68 B, 24/68 E, 68 F, 71 ST, 71 SB, 71.1, 68 CD, 909, 269, 685; 297/250.1, 463.1

(56) References Cited

U.S. PATENT DOCUMENTS

| | | | |
|---|---|---|---|
| 2,642,639 A | 6/1953 | Meighan et al. | |
| 4,510,652 A | * 4/1985 | Van Iperen | 24/68 CD |
| 4,604,773 A | 8/1986 | Weber et al. | |
| 5,426,827 A | 6/1995 | Tracy et al. | |
| 5,979,982 A | * 11/1999 | Nakagawa | 297/250.1 |
| 6,047,451 A | 4/2000 | Berger et al. | |
| 6,092,869 A | 7/2000 | Ziv | |
| 6,105,211 A | 8/2000 | Berger | |
| 6,247,208 B1 | * 6/2001 | Creech | 24/68 CD |
| 6,279,847 B1 | * 8/2001 | Berger | 24/68 CD |

* cited by examiner

*Primary Examiner*—Victor Sakran

(57) ABSTRACT

A tensioning device used to improve the retention of a child seat after its installation in an auto seat using its installed seat belts. After the child seat is placed on the auto seat and the auto seat belt is engaged about the child seat in a desired manner, the device increases tension in the auto seat belt to improve retention of the child seat. The device uses an open-end slotted and rotatable spool around which the auto seat belt is wrapped. Lever means connect with rotating and locking means, which in turn connect to the rotatable spool to wind the spool in a direction such that would result in effectively shortening of the automobile seat belt.

15 Claims, 7 Drawing Sheets

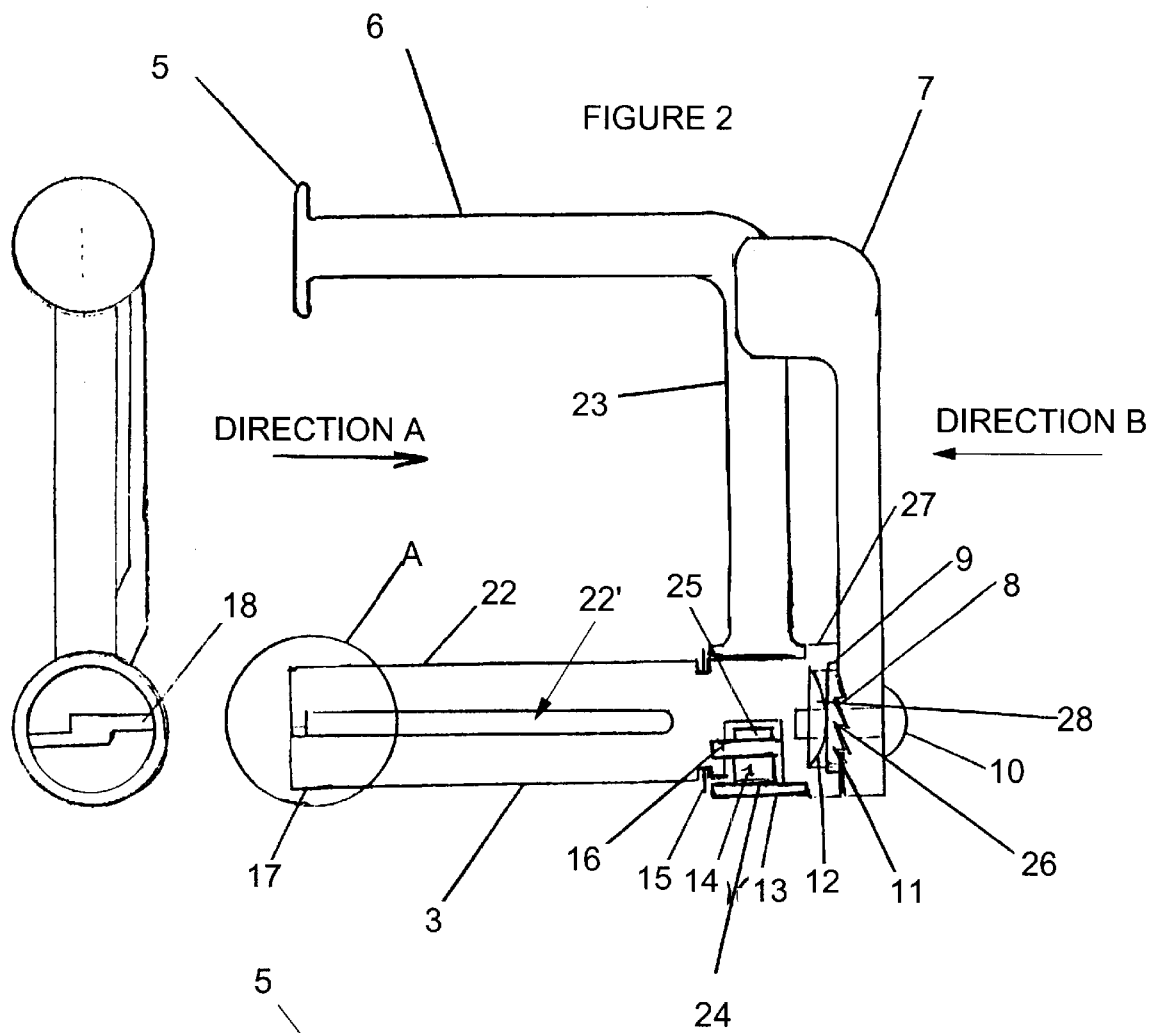
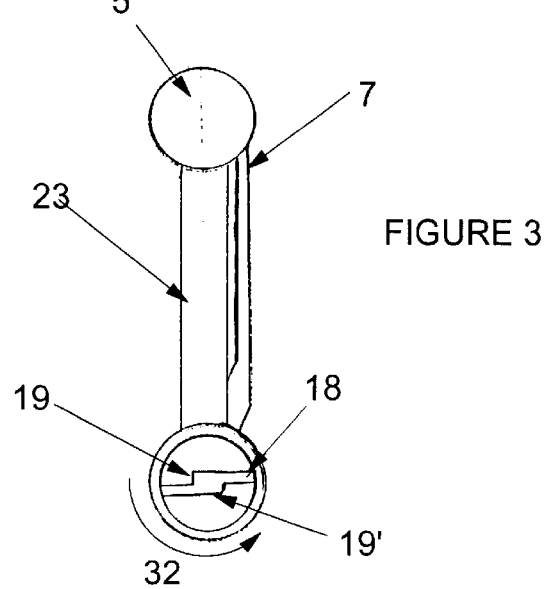

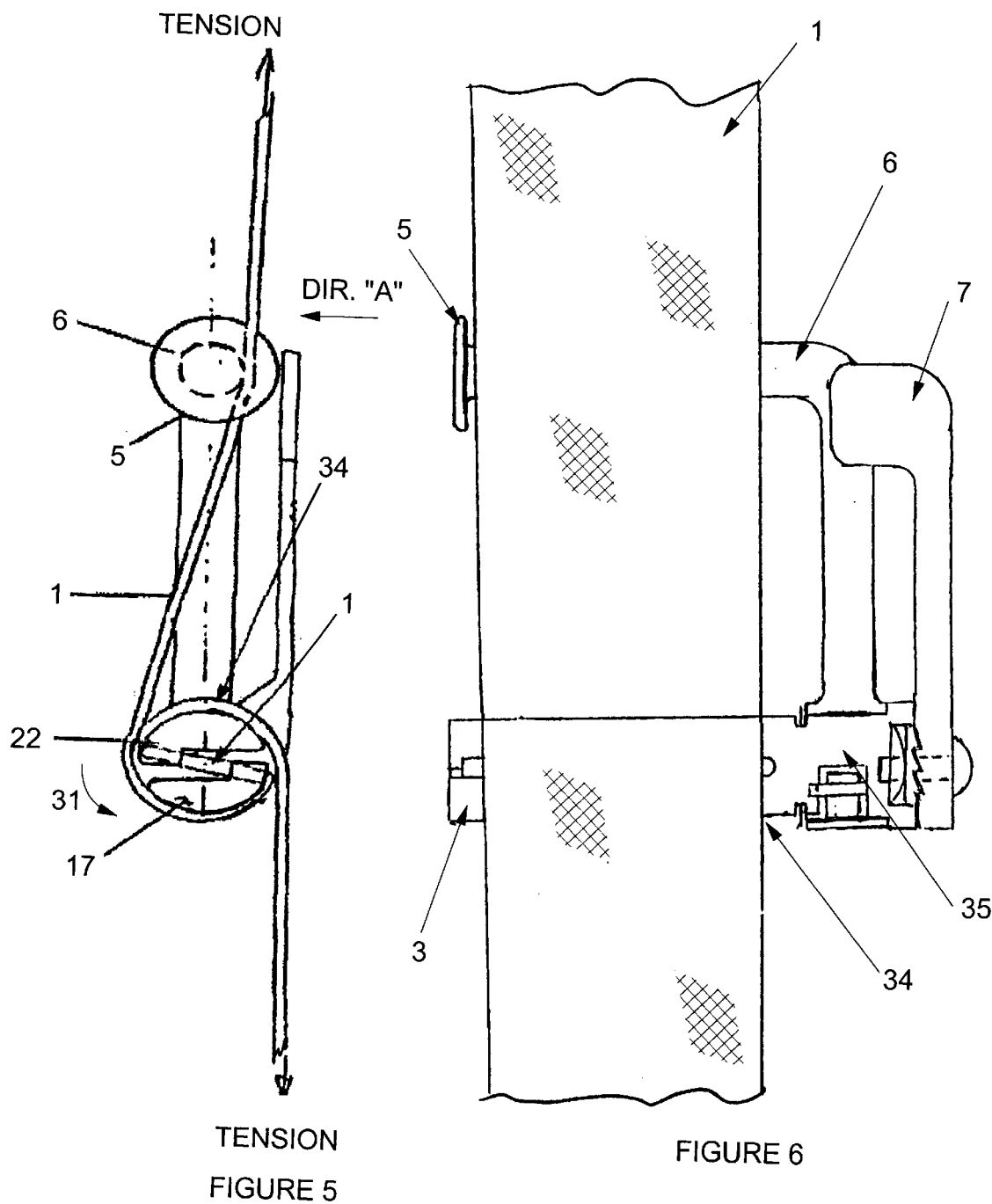

SEAT BELT TIGHTNER

This application is a continuation in part of Provisional Patent Application No. 60/233,666 filed Sep. 19, 2000.

BACKGROUND OF THE INVENTION

This invention relates to devices for improving tension on auto seat belts to retain a child seat placed thereon.

It is a common practice to employ the automobile safety seat belts to secure the child seat in the automobile. The child seat manufacturer provides instructions to the consumer as to how to safely attach the child seat to the automobile, using the automobile safety seat belts. However, due to various configurations of the automobile safety seat belt systems, the sometime complex routing of the webbing of the automobile safety seat belt in the automobile and the sometimes complex path that the webbing passes around the child seat, access slack can remain in the automobile safety seat belt system which cannot be removed. This access slack in the safety seat belt system allows the child seat to excessively move relative to the automobile seat during an accident from it pre-accident position, thus exposing the child occupant to a greater risk of severe injury or even death. Unless otherwise mentioned, the phrase "seat belt" will refer to the auto or vehicle seat belt previously mounted in an auto or other vehicle (such as a seat on an airplane or boat) to restrain movement of a person sitting in that seat.

The prior art include a wide variety of belt tensioning devices. U.S. Pat. No. 6,092,869 describes a open U-shaped metal piece that receives the side of a seat belt so that the metal piece is rotated by a twisting motion on an arm extended from one of the U-ends of the metal piece. There is somewhat of a disadvantage in this device in that force from rotation of that arm is not well translated to the belt tightening rotation motion required for desired levels of belt tension.

U.S. Pat. No. 4,604,773 uses an open end dowel piece secured on both sides of the engaged belt in a support frame. In order to insert the dowel piece the hex opening and the hex ratchet on the opposite side must be perfectly aligned, this can be difficult to accomplish in places where accessibility is limited. The same, difficulty applies to the removal of the dowel piece where both sides of the hex opening must be perfectly aligned, as well.

U.S. Pat. Nos. 6,047,451 and 6,105,211 uses a center opening in a partially slotted rod to receive a seat belt to be wound around it. This center opening is difficult to engage the seat belt if it is narrow enough to be safe in retaining a highly tightened belt and potentially dangerous if wide enough to permit easy insertion of the seat belt. It is clear to the skilled person if the center opening to the slotted portion is great enough, the belt will simply slip free of the slotted portion in a sudden tightening of the belt as in an auto accident, resulting is a relatively un-tensioned belt and possibly increasing the harm to the child seat occupant. Another disadvantage is that in order to remove the device the seat belt must be first completely unwound from the partially slotted rod, the seat belt has to be released from its retaining slotted portion of the rod and only then it may be removed.

U.S. Pat. No. 2,642,639 displays once again the prior art concern that a belt tensioning device should be secured on both sides of the belt for effective securement of the tensioning device.

U.S. Pat. No. 5,426,827 uses a non-ratcheting device for belt tensioning as in U.S. Pat. No. 6,092,869.

There is a need for a device that overcomes the limitations of the prior art so that the user can have the benefit of an open-end slotted device with mechanical advantage of the devices that are supported on both sides of a seat belt.

SUMMARY OF THE INVENTION

A tensioning device used to improve the retention of a child seat after its installation in an auto seat using its installed seat belts. After the child seat is placed on the auto seat and the seat belt is engaged about the child seat in a desired manner, the device increases tension in the seat belt to improve retention of the child seat. The device uses a rotatable spool around which the auto seat belt is wrapped. Lever means connect with rotating and locking means, which in turn connect to the rotatable spool to wind the spool in a direction such that would result in effectively shortening of the automobile seat belt. A rotation preventing arm, similar in function to the rotation preventing arm of U.S. Pat. No. 6,092,869, extends from the device frame so that it does not rotate with either the spool or the lever means but is integral with the rotating and locking means in a manner that causes the spool to be prevented from rotating against the urging direction of the seat belt wound around the spool. The rotation preventing arm (or securing arm) prevents the spool from unwinding thus releasing the webbing.

The device can easily be removed from the seat belt by releasing the tension on the seat belt and sliding it in a direction perpendicular AND AWAY FROM to the seat belt.

The purpose of the present invention is to provide the user with a device that would allow him to remove the access slack from the automobile safety seat belt system and to increase and maintain the tension on the automobile safety seat belt. The reduced slack and increase belt tension will result in a more secured child seat installation, reducing its movement relative to the automobile seat during an accident, and thus reducing the risk of severe injury or even death to the child occupant.

DESCRIPTION OF THE DRAWINGS

FIG. 2 is a top view of the device.

FIG. 3 is a side view of the of the device looking from Direction "A" as in FIG. 2.

FIG. 5 is the device of FIG. 2 showing the routing of the automobile safety seat belt webbing after it was wound on the spool.

FIG. 6 is top view of FIG. 5 looking from Direction "A" in FIG. 5 showing the position of the securing arm as it prevents the unwinding of the seat belt.

DETAILED DESCRIPTION OF THE INVENTION

Figure 15:
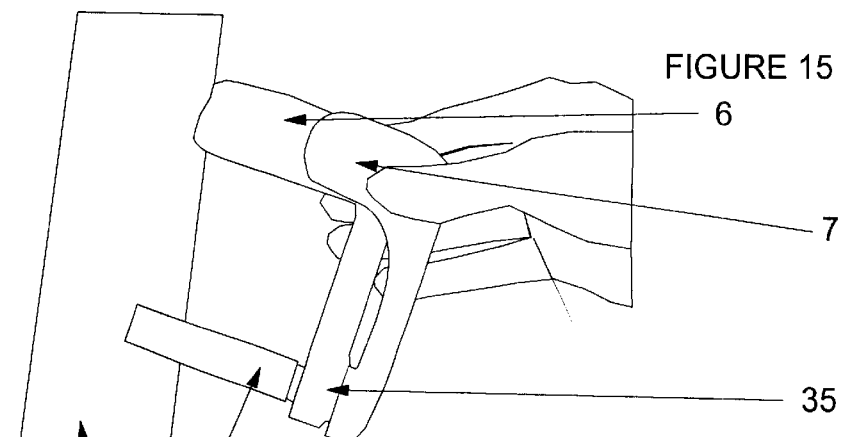
FIG. 15 is a top view of a user holding the invention device and a seat belt partially inserted into the spool
Figure 16:
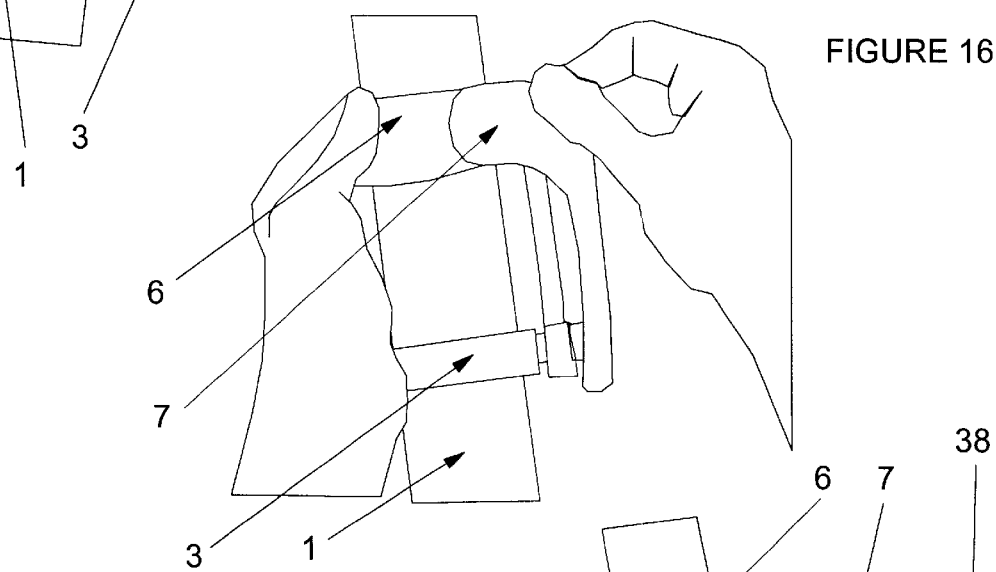
FIG. 16 is the top view of FIG. 15 with the seat belt fully inserted into the spool, where the user with one hand holds the securing arm and with the other hand holds the lever means.
Figure 17:
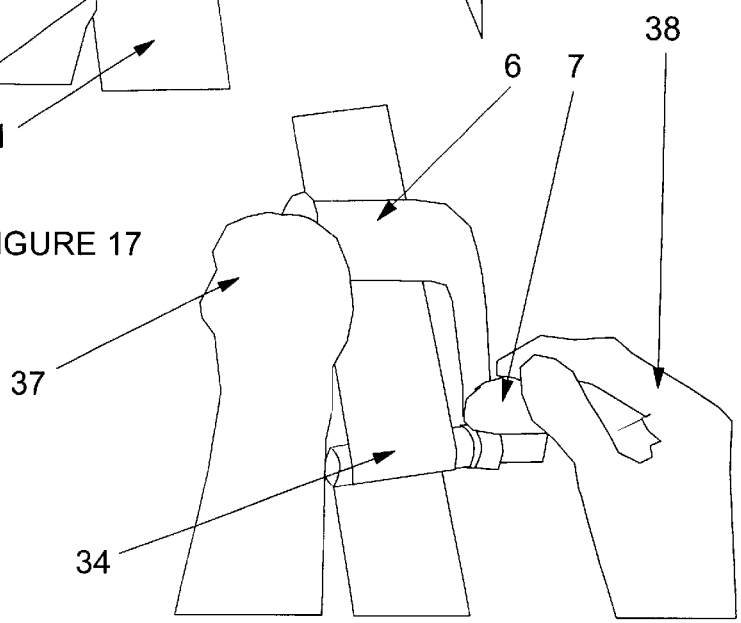
FIG. 17 is the top view of FIG. 16 after at least partial winding of the seat belt on the spool, where the user has moved apart the securing arm and the lever means thereby causing the spool to forcibly rotate with the lever means in a counterclockwise manner as viewed in FIG. 3.
Figure 18:
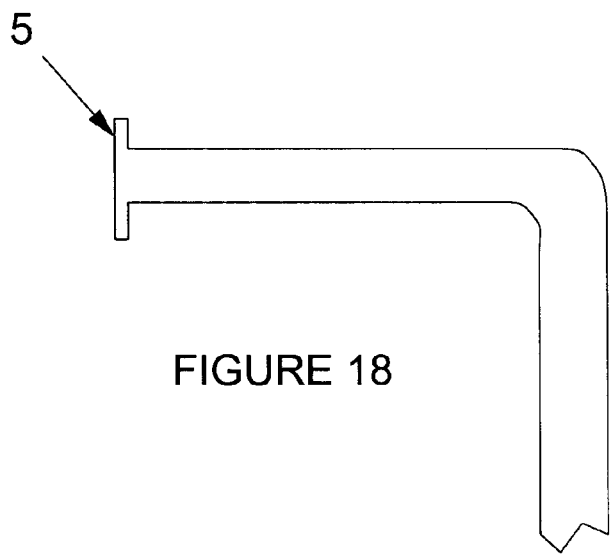
FIGS. 18 and 19 are respectively side and top views of the body of the invention without the head showing means for preventing slippage of a seat belt in the form of a cap at the end of the securing arm.
Figure 19:
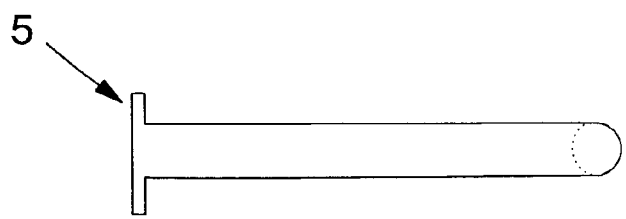
Figure 20:
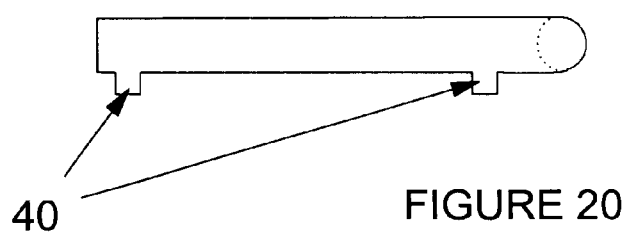
FIG. 20 is a top view of the body of the invention without the head showing an alternate embodiment of means for preventing slippage of a seat belt in the form of radial extensions from the securing arm.
Figure 21:
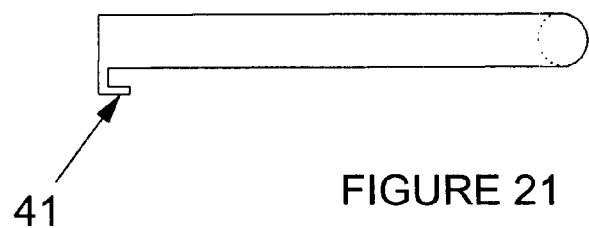
FIG. 21 is a top view of the body of the invention without the head showing another alternate embodiment of means for preventing slippage of a seat belt in the form of radial extensions from the securing arm.

The present invention is now discussed with reference to the Figures. The invention device comprises rotating and locking means formed in alternate opposing configurations so that either of two lever to securing arm directions can cause the seat belt to be wound around spool prongs. FIGS. 2–6 generally describe a device whereby bringing together the lever to securing arm causes such seat belt winding. FIGS. 15–17 generally describe a device whereby forcing apart the lever to securing arm causes such seat belt winding.

With reference to FIGS. 2–6, one embodiment of the invention device comprises a body 23 having a round bar bent in an "L" shape forming an extension roughly normal to the axis of the spool 3 providing the effective support for a securing or locking arm 6 maintained at about a position generally parallel to the axis of the spool 6. A cap 5 is mounted on the free end of arm 6. The diameter of cap 5 is larger than the diameter of the arm 6 and its purpose is to help locating the webbing on the securing or locking arm 6. It is clear to the skilled person with reference to this description that integral connection of the arm 6 to the extension of body 23 with its function described below can be accomplished with many equivalent structures.

At the other end of the extension part of body 23, head 13 is located by rigid attachment. Head 13 comprises a bore with an axis substantially the same as that of spool 3, the bore further comprising an inside surface adapted with means to permit rotation of the spool in only one direction in the operation described below, as in path or direction 31 of FIG. 5 or identically direction 32 of FIG. 3. One such adaptation to permit a single directional rotation of spool 3 comprises forming on the inside surface of the bore internal teeth 24 located along its internal circumference. In assembling the invention device, the pronged end of spool 3 is inserted in the right side opening of bore of the head 23 as in FIG. 2 and continuing such insertion to accomplish the invention structure.

Spool 3 comprises two prongs 17 and 22 extending sufficiently to form an open ended slot 22' adapted to have a greater width than the seat belt 1 as shown in FIG. 6. Referring again to FIG. 2, spool 3 extends from prongs 17 and 22 through the bore of head 13 to a retaining shoulder 27 that slidingly abuts an outer edge of head 13 on one side and an inner surface of lever 7 on another side, wherein such zone are located components of rotating and locking means, the other such components are separate or integral with head 13 and lever 7 to form the two ratchets 25 and 26. The spool 3 is secured for rotation inside the bore of head 13 by the circular shoulder 27 with a diameter generally larger than that of the head 13. On the side of head 13 opposite the shoulder 27, a spring 15 urges head 13 against shoulder 27 which maintains the axis of spool 3 substantially in line with the axis of the bore of head 13 during operation and rotation of spool 3.

With reference to a specific embodiment of ratcheting mechanism of the invention rotating and locking means, first ratchet 25 comprises a dog 14 which rotatably pivots on a round pin 16 so that its end pointed away from the bore axis will securingly engage one of the notches of internal teeth 24 formed on the inside surface of the bore of head 13. A spring (not shown) urges the dog 14 to constantly engage the teeth 24. The position of the dog 14 is such that it allows rotation of the spool 3 in the belt winding direction 30 in FIG. 4 or direction 31 of FIG. 5, and prevent counter-rotation of the spool in the opposite direction, by locking into the teeth 24 in head 13. Adjacent to the ratchet 25 and located within a cavity 28 within shoulder 27 at the end of spool 3, second ratchet 26 operates to transmit the rotational force of the direction 30 action of lever 7 into rotation of spool 3 to wind up seat belt 1 into a highly tensioned state.

Ratchet 26 comprises a disc spring 12 abutting the bottom of cavity 28 and an inside surface of a floating disc ratchet 11. Ratchet 11 comprises a plurality of extensions 8 located on its circumference that each extend to engage longitudinal grooves in the perimeter of cavity 28 so that ratchet 11 engages lever 7 means and transmits its direction 31 action into rotational movement of spool 3. Lever 7 means for engaging the notches of ratchet 11 comprise a disc ratchet 9 arranged on an inside surface of lever 7, whereby a pin 10 passes through a bore in lever 7, ratchets 9 and 11 and spring 12 to be secured in a bottom of cavity 28, which structure keeps ratchet 26 assembly together for the invention operation. This embodiment illustrates ratchet 26 as a double toothed disc construction, however, several prior art ratchet and pawl mechanisms are its substitutable equivalents,. such as the ratcheting mechanism of ratchet 25.

Figure 14:
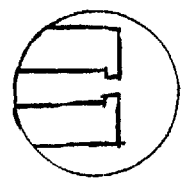
FIGS. 13 and 14 are end views of Area A in FIG. 12 where a first end closure structure is shown respectively in the untensioned and belt-tensioned modes.
Figure 12:
FIG. 12 is an alternate embodiment of the Area A in FIG. 2.
Figure 13:
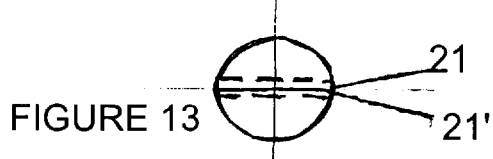

To increase the resistance to torsional deformation of prongs 17 and 22, a special locking configuration of the end of the prongs (as referred to as "Area 'A'") is described in FIGS. 7–13 in the First and Second embodiments of Area 'A'. As a result of the sudden velocity change that occurs during an auto crash, the tension on the seat belt increases instantly and with great force. As a result of the tension on the webbing during a crash, the webbing acts to produce initially the "hoop load" force arrows of FIG. 7. The hoop load on the two prongs will cause the two prongs to move toward each other, thus causing them in the embodiments of FIGS. 7–8 and 9–11 to lock into each other respectively through projections 19 and 19' or through projections 20 and 20'. This locking action will prevent the side motion of the Prongs in the directions C. Without the locking structure of the prong ends, the prongs could potentially continue sliding in directions C and allow the wound seat belt to become loosened. A third embodiment of Area 'A' is shown in FIGS. 12–14. In this case, the projections 21 and 21' will not lock into each other, but will ensure that a gap between the prongs is maintained in order to minimize the compressive forces on the webbing during an accident. In addition, projections 19 and 19' and 20 and 20' are also design in such a way that when they are engaged, a gap between the prongs is maintained in order to minimize the compressive forces on the webbing during an accident.

Figure 1:
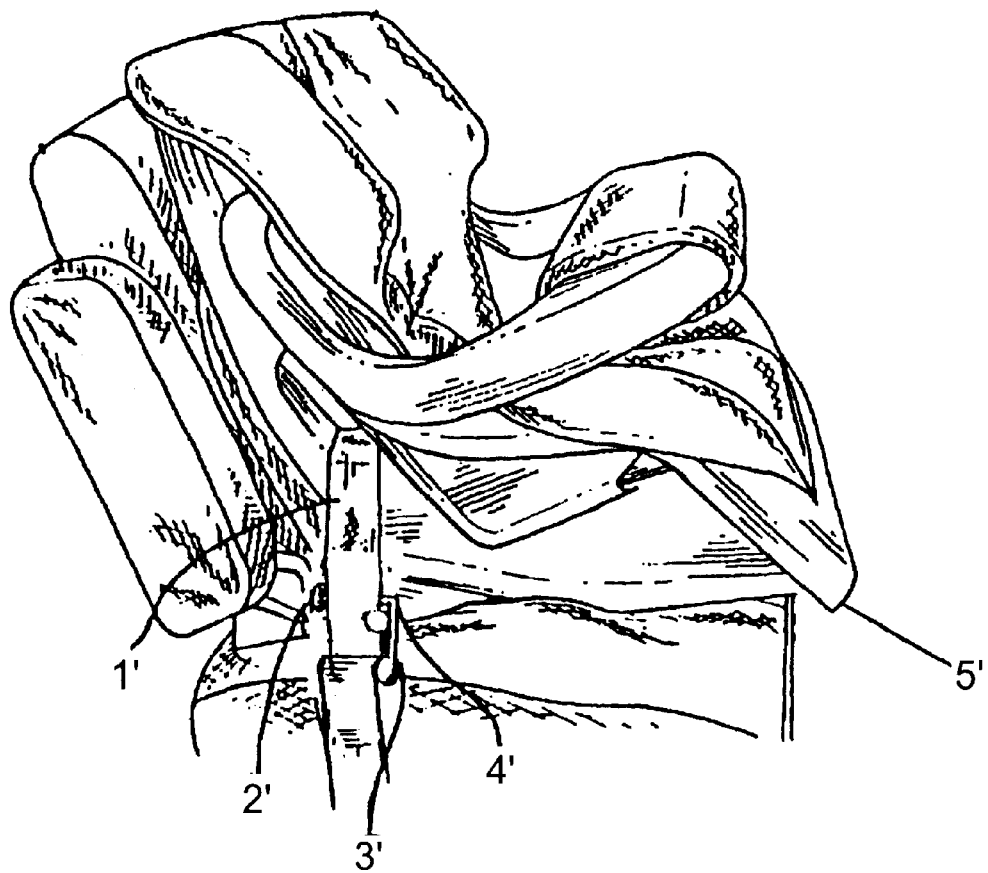
FIG. 1 is an exemplary child seat installation in an automobile showing invention device installed to remove seat belt tension.
Figure 4:
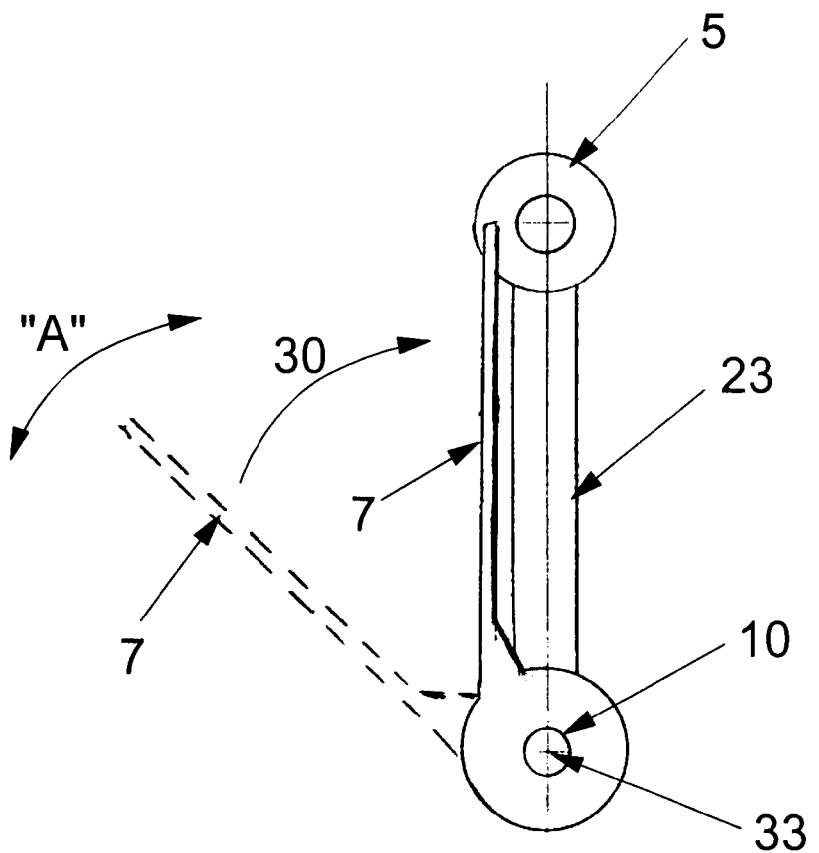
FIG. 4 is a side view of the of the device looking from Direction "B" as in FIG. 2.
Figure 7:
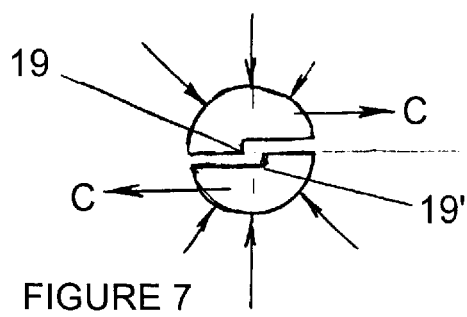
FIGS. 7 and 8 are end views of Area A in FIG. 2 where a first end closure structure is shown respectively in the untensioned and belt-tensioned modes.
Figure 8:
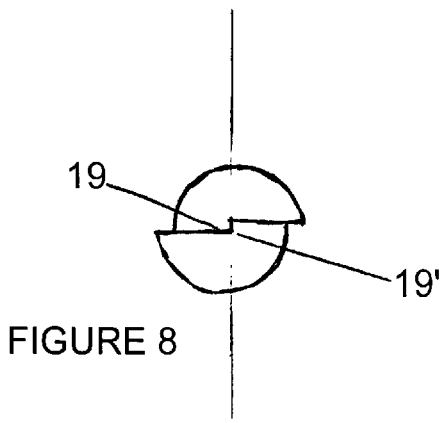
Figure 11:
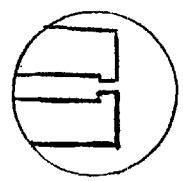
FIG. 11 is an alternate embodiment of the Area A in FIG. 2.
Figure 9:
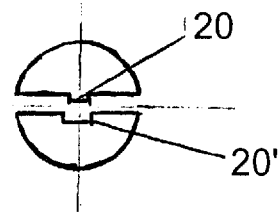
FIGS. 9 and 10 are end views of Area A in FIG. 11 where a first end closure structure is shown respectively in the untensioned and belt-tensioned modes.
Figure 10:
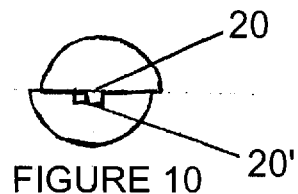

Installation and operation of the invention device is now described. After placing a child seat 5' in a vehicle seat using the vehicle seat belts 1, as in FIG. 1, the device is attached to the seat belt webbing by inserting the seat belt webbing through opening 18 into the slot 22', the initiation step shown clearly in FIG. 15, with spool 3 connected with the rotating and locking means 35. Prongs 17 and 22 are spaced apart to allow the seat belt 1 to be located entirely within the slot 22' as in FIG. 16. At the same time that the seat belt 1 is being inserted into slot 22', arm 6 is located above the seat belt webbing ensuring that cap 5 passed the opposite edge of the webbing as shown in FIG. 6.

In general, the positioning of the arm 6 in relation to the seat belt webbing is such that it interaction with the seat belt 1 will create torque on the device which will counter react the torque created by the tension of the seat belt webbing acting on the spool 3 and will prevent the unwinding of the webbing. FIG. 17 shows arm 6 above the seat belt 1, opposite to the preferred location of the devices of FIGS. 2–6. FIG. 17 shows that the user's hands 37 and 38 cause arm 6 and lever 7 to be moved apart to cause the tensioning winding of the seat belt. The skilled person will appreciate that reversing the teeth orientations of the first and second ratchets 25 and 26 will accomplish this effect for a second form of the invention device. After positioning the seat belt 1 and arm 6 as described above, the user will start to wind the seat belt around spool 3 by moving lever 7 back and forth as shown as direction A FIG. 4. The motion of the lever 7 in the winding direction 31 is transferred through the teeth of ratchet 9 to the teeth of ratchet 11 and through the extensions 8 to spool 3 which by turning causes the seat belt 1 to be wound around it and have a shortened effective length and by doing so tightens the child seat retention in the automobile. After the lever 7 has reached its travel limit in direction 31, the user moves it in the opposite direction. When moving lever 7 in the opposite direction, spool 3 does not turn in that direction since it is prevented from rotating by the dog 14 which engages the teeth 24 (dog 14 is urged by a spring (not shown) to allow rotation of the spool only in the webbing winding direction). While spool 3 is kept stationary by dog 14, the teeth of ratchet 9 and the ratchet 11 will skip over each other by compressing spring 12. After the lever was rotated a sufficient amount, the user rotates it back in the winding direction 31, causing the teeth of ratchet 9 and those of ratchet 11 to engage and transmitting the rotational movement to spool 3 and winding the seat belt webbing an additional amount. This operation repeats until the user is satisfied that the child seat is secured enough. To remove the device, the user will first disengage the car seat belt and then slide the webbing out of slot 22'.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:
1. A device for tightening a seat belt comprising:
   (a) a spool having a rotational axis, whereabout a plurality of prongs are secured substantially in their lengths to form a slot with an open end and a closed end, such that the spool is extended along the rotational axis from the closed end through a bore of a head of a body and that spool extension is adapted to be secured in the bore so that it is rotatable only in one direction about the rotational axis within the bore;
   (b) an arm extension extending from the head away from the rotational axis and connected to a securing arm spaced substantially apart from the spool by the arm extension;
   (c) a lever rotatably secured at one end to an end of the spool extension and adapted to cause the spool to rotate in a winding direction in moving the lever toward or away from the securing arm.
2. The device of claim 1 wherein the slot is at least as long as the width of the seat belt.
3. The device of claim 1 wherein ratchet means are integrated into the head, spool extension and lever to permit spool rotation only in a winding direction.
4. The device of claim 1 wherein a first ratchet means comprise ratchet and pawl means arranged between an inside surface of the bore and the spool extension to permit spool rotation only in a winding direction.
5. The device of claim 1 wherein the securing arm is adapted to abut the seat belt when the seat belt is inserted into the slot and the spool is turned by action of the lever in the winding direction.
6. The device of claim 5 wherein the securing arm is adapted to extend across the width of the seat belt in its abutting position, providing the sole means for preventing counter rotation of the device when the seat belt is wound around the spool.
7. The device of claim 6 wherein slippage preventing means are attached to the securing arm and are adapted to prevent slippage of the seat belt from abutment with the securing arm.
8. The device of claim 1 wherein locking means are provided on free ends of the prongs.
9. The device of claim 8 wherein the locking means comprise forming non-parallel surfaces on opposing faces of the prong ends such that hoop tension on the prongs will cause the non-parallel faces to lock together and oppose a tendency of the opposing faces of the prongs to slide apart.
10. A device for tightening a seat belt comprising:
   (a) a plurality of prongs forming an open end and attached at their other ends to a first extension thereby forming a spool having a rotational axis, such that the first extension is extended along a rotational axis through a bore of a head having the same rotational axis and whereby the first extension is adapted to be secured in the bore so that it is rotatable only in one direction about the rotational axis;
   (b) an arm extension extending from the head away from the rotational axis and connected to a securing arm spaced apart from and substantially parallel with the prongs;
   (c) a lever rotatably secured at one end to an end of the spool extension and adapted to cause the spool to rotate in a winding direction in moving the lever toward or away from the securing arm.

11. The device of claim 10 wherein ratchet means are integrated into the head, spool extension and lever to permit spool rotation only in a winding direction.

12. The device of claim 10 wherein a first ratchet means comprise ratchet and pawl means arranged between an inside surface of the bore and the spool extension to permit spool rotation only in a winding direction.

13. The device of claim 10 wherein the securing arm is adapted to abut the seat belt when the seat belt is inserted into the slot and the spool is turned by action of the lever in the winding direction.

14. The device of claim 13 wherein the securing arm is adapted to extend across the width of the seat belt in its abutting position, providing the sole means for preventing counter rotation of the device when the seat belt is wound around the spool.

15. The device of claim 14 wherein slippage preventing means are attached to the securing arm and are adapted to prevent slippage of the seat belt from abutment with the securing arm.

* * * * *